United States Patent Office 3,132,061
Patented May 5, 1964

3,132,061
EXOTHERMIC COMPOSITION CONTAINING PERLITE
John P. Walsh and Harold F. Bishop, Conneaut, Ohio, assignors to Exomet Incorporated, Conneaut, Ohio, a corporation of Ohio
No Drawing. Filed June 22, 1962, Ser. No. 204,633
2 Claims. (Cl. 149—41)

This invention relates to exothermic compositions, and has for its object the provision of an improved exothermic composition for use in various metallurgical operations. The improved exothermic composition of the invention may be used in the loose or bulk form but is particularly suitable for molding to produce riser sleeves, cores, hot tops, wall members for hot tops, pads and the like. The moldable compositions are preferably provided as dry intimately mixed granular materials which are mixed with a small amount of water and a binder to form molded articles which may be used as molded, or when baked in a manner similar to forming baked cores.

The common moldable exothermic compositions usually have been so proportioned as to have an insufficient amount of oxygen compounds such as sodium nitrate, iron oxide and manganese oxide to completely oxidize the aluminum and, accordingly, atmospheric oxygen is permitted to be absorbed as is necessary to complete the oxidation of the aluminum at a relatively slow rate. Such compositions usually also contain granular refractory material which does not melt to maintain the physical shape of the molded article. Potassium fluoride and metal fluoborates have been used in the compositions to react with the oxide film which forms on the aluminum and produce a liquid phase which is removed to expose the aluminum for further oxidation.

This invention is based on our discovery that the mineral perlite, a light weight (about 16 pounds per cubic foot) refractory material melting at about 2100° F., can be used in exothermic compositions which develop temperatures in excess of 3000° F., and that the compositions will retain their molded shapes at the end of the reaction. Perlite is primarily a siliceous volcanic rock containing from 70 to 80% of silica but is very bulky and of relatively light weight. The unpredictable behavior of perlite in the exothermic composition appears to be explainable as follows: Although the perlite melts at about 2100° F., the aluminum oxide reaction produces a highly refractory honeycombed structure around the perlite particles. The voids remaining after the perlite has melted act as insulators to retard heat loss from the molded exothermic article. Heretofore, in the field of exothermics, it has always been deemed necessary that the refractory component be of the high-temperature melting type such as those containing high percentages of aluminum oxide or magnesium oxide which have melting points in excess of the reaction temperature of the exothermic material.

Other minerals of a light-weight bulky nature such as the foliated micaceous minerals sold under the trade names Sil-O-Cel and Vermiculite may be used but we prefer perlite. One of the desirable characteristics of light-weight materials such as perlite is that they have a much lower specific heat than the higher-temperature refractories such as aluminum oxide. As a result, they permit higher temperatures to be obtained during the exothermic reaction with the same amount of heat liberation. Also, their light weight reduces the effort to handle them, and the shipping charges are lower.

Another feature of the improved exothermic material is the use of aluminum dross, preferably as a course fraction sized to 10 to 60 mesh, to supply the metallic aluminum. The dross contains from 12 to 40% of aluminum with the balance aluminum oxide and, accordingly, serves to supply both the aluminum metal and the refractory aluminum oxide at a relatively low cost.

While we may use in the composition potassium fluoborate and sodium nitrate as shown in Examples 1 and 2 below, as in conventional practice in making moldable exothermics, we have found that there are marked advantages in using sodium fluoborate because of its greater reactivity. We have found that the chemical activity of sodium fluoborate is such that 2% sodium fluoborate, as in Example IV, can replace 1% of potassium fluoborate and 9.4% sodium nitrate to obtain the same thermal properties. The advantages of using fluoborate in this manner is that the material becomes more resistant to moisture and produces less smoke upon reaction.

The following examples illustrate moldable exothermic compositions of the invention:

Example I lists a range of components of one type of exothermic composition:

| | Percent |
|---|---|
| Aluminum | 15–28 |
| Aluminum dross | 10–50 |
| Perlite | 5–30 |
| Sodium nitrate | 4–20 |
| Organic binders | 5–15 |
| Iron oxide | 20–40 |
| Potassium fluoborate | .5–2.5 |

Example II lists a specific composition of the type of Example I:

| | Percent |
|---|---|
| Aluminum grindings | 3.2 |
| Aluminum foil (−10 +100) | 20.0 |
| Aluminum dross | 18.2 |
| Perlite | 11.6 |
| Sodium nitrate | 9.4 |
| Goulac | 4.8 |
| Shell resin | 3.6 |
| Red iron oxide | 27.2 |
| Vinsol | 1.0 |
| Potassium fluoborate | 1.0 |

Example III lists a range of components of a type of exothermic composition utilizing sodium fluoborate:

| | Percent |
|---|---|
| Aluminum | 15–28 |
| Aluminum dross | 10–50 |
| Perlite | 5–30 |
| Organic binders | 5–15 |
| Iron oxide | 20–40 |
| Sodium fluoborate | 1–6 |

Example IV lists a specific composition of the type of Example III:

| | Percent |
|---|---|
| Aluminum grindings | 3.0 |
| Aluminum foil (−40 +100) | 20.2 |
| Aluminum dross | 24.2 |
| Perlite | 16.2 |
| Goulac | 4.9 |
| Shell resin | 3.2 |
| Red iron oxide | 26.3 |
| Sodium fluoborate | 2.0 |

Example V lists a range of components of another type of exothermic composition:

| | Percent |
|---|---|
| Aluminum | 15–40 |
| Barium nitrate | 3–10 |
| Granular refractory | 10–35 |
| Organic acid | .1–1.5 |
| Organic binders | 5–15 |
| Perlite | 5–30 |
| Potassium fluoborate | .5–2.5 |
| Iron oxide | 15–40 |

Example VI lists a specific composition of the type of Example V:

| | Percent |
|---|---|
| Aluminum powder (123) | 9.2 |
| Aluminum foil (—40 +100) | 18.3 |
| Barium nitrate | 6.2 |
| Calamo 35 | 20.2 |
| Citric Acid | .3 |
| Goulac or Dexocor | 3.5 |
| Shell resin | 5.4 |
| Perlite | 13.7 |
| Potassium fluoborate | 1.0 |
| Red iron oxide | 22.2 |

In the compositions of the above examples: Perlite 40B is an expanded mineral. Goulac is an organic binder consisting of lignosulfonate, of the Robeson Process Co. Vinsol is the substantially gasoline insoluble fraction of a solvent extract of pine wood of the Hercules Powder Company. Calamo is a clay consisting of $Al_2O_3$ 35–50% and silica 40–60% with small amounts of other oxides. Calamo 35 is ground to a particle size range equivalent to the specifications of the American Foundrymen's Society for classifying sands.

Compositions as illustrated in the examples may be molded into articles of the desired shapes in any desired manner, for example, according to the methods used in forming sand cores and sand molds. The shell resin is a dry powdered phenol-formaldehyde thermosetting resin which makes it possible to form rigid molded articles by the shell mold technique.

When the molded article, for example a sleeve or core, is inserted into a mold and heated by the metal to approximately 2000° F. it will ignite and glow slowly for an appreciable length of time, producing within itself a temperature of over 3200° F. Because of the high percentage of non-fusible refractory and the amount of heat released the composition does not melt but retains substantially its original shape.

We claim:

1. The improved moldable exothermic composition comprising particulate aluminum 15 to 40%, iron oxide 20 to 40%, 3 to 20% of a nitrate of the group consisting of sodium nitrate and barium nitrate, said iron oxide and nitrate being in an amount insufficient to completely oxidize the aluminum, from 5 to 30% by weight of a light-weight bulky mineral of the group consisting of foliated micaceous mineral and perlite which melts at a temperature below the temperature resulting from the exothermic reaction of the composition, an organic binder, and 10 to 35% of a refractory oxide which does not melt at the temperature resulting from the exothermic reaction of the composition.

2. A moldable composition as defined in claim 1 which comprises from 10 to 50% of aluminum dross, said aluminum dross contains aluminum oxide which serves as a refractory material.

References Cited in the file of this patent

UNITED STATES PATENTS

| 2,798,818 | Pletsch | July 9, 1957 |
| 2,836,484 | Streng | May 27, 1958 |